United States Patent
Henke et al.

(10) Patent No.: US 11,054,233 B2
(45) Date of Patent: Jul. 6, 2021

(54) HYDRAULIC TIME DELAY ACTUATED BY THE ENERGETIC OUTPUT OF A PERFORATING GUN

(71) Applicant: Hunting Titan, Inc., Pampa, TX (US)

(72) Inventors: Joseph Albert Henke, Hallettsville, TX (US); Johnny Covalt, Burleson, TX (US)

(73) Assignee: Hunting Titan, Inc., Pampa, TX (US)

(*) Notice: Subject to any disclaimer, the term of this patent is extended or adjusted under 35 U.S.C. 154(b) by 24 days.

(21) Appl. No.: 16/632,831

(22) PCT Filed: Jul. 25, 2018

(86) PCT No.: PCT/US2018/043725
§ 371 (c)(1),
(2) Date: Jan. 21, 2020

(87) PCT Pub. No.: WO2019/023363
PCT Pub. Date: Jan. 31, 2019

(65) Prior Publication Data
US 2020/0166320 A1    May 28, 2020

Related U.S. Application Data (60) Provisional application No. 62/536,830, filed on Jul. 25, 2017.

(51) Int. Cl.
*F42C 9/06* (2006.01)
*E21B 43/1185* (2006.01)
(Continued)

(52) U.S. Cl.
CPC .......... *F42C 9/06* (2013.01); *E21B 43/11855* (2013.01); *F42D 1/06* (2013.01); *E21B 43/117* (2013.01)

(58) Field of Classification Search
CPC .. F42C 9/06; E21B 43/1185; E21B 43/11852; E21B 43/11855; F42D 1/06
See application file for complete search history.

(56) References Cited

U.S. PATENT DOCUMENTS

| | | | | |
|---|---|---|---|---|
| 4,616,701 A | * | 10/1986 | Stout | E21B 43/11855 166/297 |
| 4,678,044 A | * | 7/1987 | Luke | E21B 43/11852 175/4.52 |

(Continued)

FOREIGN PATENT DOCUMENTS

| WO | 9001103 A1 | 2/1990 |
|---|---|---|
| WO | 2017139656 A1 | 8/2017 |

OTHER PUBLICATIONS

Notification of Transmittal of the International Search Report and the Written Opinion of the International Searching Authority, PCT Application No. PCT/US18/43725, dated Oct. 11, 2018, 9 pages.

(Continued)

*Primary Examiner* — Joshua T Semick
(74) *Attorney, Agent, or Firm* — Christopher McKeon; Jason Saunders; Arnold & Saunders (57) ABSTRACT

A mechanical gun to gun delay for providing a desired time delay between the firing of a first gun and the firing of a second gun downhole without using a pyrotechnic fuse as the delay.

17 Claims, 3 Drawing Sheets

(51) Int. Cl.
*F42D 1/06* (2006.01)
*E21B 43/117* (2006.01)

(56) References Cited

U.S. PATENT DOCUMENTS

| | | | | |
|---|---|---|---|---|
| 4,762,179 A | * | 8/1988 | Wesson | E21B 43/11852 166/297 |
| 4,911,251 A | * | 3/1990 | George | E21B 43/11852 175/4.54 |
| 5,603,384 A | * | 2/1997 | Bethel | E21B 43/11855 175/4.54 |
| 5,865,254 A | * | 2/1999 | Huber | E21B 34/063 166/373 |
| 5,890,539 A | | 4/1999 | Huber et al. | |
| 5,992,289 A | | 11/1999 | George et al. | |
| 6,102,126 A | * | 8/2000 | Huber | E21B 43/11852 166/373 |
| 6,595,289 B2 | * | 7/2003 | Tumlin | E21B 33/134 166/177.4 |
| 8,322,426 B2 | * | 12/2012 | Wright | E21B 34/063 166/317 |
| 8,763,507 B2 | * | 7/2014 | Ross | E21B 43/11852 89/1.15 |
| 8,851,160 B2 | * | 10/2014 | Stolboushkin | E21B 43/11855 166/55.2 |
| 8,991,496 B2 | * | 3/2015 | Bishop | E21B 43/11852 166/298 |
| 2010/0051278 A1 | | 3/2010 | Mytopher et al. | |
| 2013/0014990 A1 | | 1/2013 | Barton et al. | |
| 2019/0048693 A1 | * | 2/2019 | Henke | E21B 43/11855 |

OTHER PUBLICATIONS

Communication with Supplementary European Search Report based on EP18837382.3 dated Mar. 30, 2021, 7 pages.

* cited by examiner

HYDRAULIC TIME DELAY ACTUATED BY THE ENERGETIC OUTPUT OF A PERFORATING GUN

RELATED APPLICATIONS

This application claims priority to U.S. Provisional Application No. 62/536,830, filed Jul. 25, 2017.

BACKGROUND OF THE INVENTION

Generally, when completing a subterranean well for the production of fluids, minerals, or gases from underground reservoirs, several types of tubulars are placed downhole as part of the drilling, exploration, and completions process. These tubulars can include casing, tubing, pipes, liners, and devices conveyed downhole by tubulars of various types. Each well is unique, so combinations of different tubulars may be lowered into a well for a multitude of purposes.

A subsurface or subterranean well transits one or more formations. The formation is a body of rock or strata that contains one or more compositions. The formation is treated as a continuous body. Within the formation hydrocarbon deposits may exist. Typically a wellbore will be drilled from a surface location, placing a hole into a formation of interest. Completion equipment will be put into place, including casing, tubing, and other downhole equipment as needed. Perforating the casing and the formation with a perforating gun is a well known method in the art for accessing hydrocarbon deposits within a formation from a wellbore.

Explosively perforating the formation using a shaped charge is a widely known method for completing an oil well. A shaped charge is a term of art for a device that when detonated generates a focused explosive output. This is achieved in part by the geometry of the explosive in conjunction with an adjacent liner. Generally, a shaped charge includes a metal case that contains an explosive material with a concave shape, which has a thin metal liner on the inner surface. Many materials are used for the liner; some of the more common metals include brass, copper, tungsten, and lead. When the explosive detonates the liner metal is compressed into a super-heated, super pressurized jet that can penetrate metal, concrete, and rock. Perforating charges are typically used in groups. These groups of perforating charges are typically held together in an assembly called a perforating gun. Perforating guns come in many styles, such as strip guns, capsule guns, port plug guns, and expendable hollow carrier guns.

Perforating charges are typically detonated by detonating cord in proximity to a priming hole at the apex of each charge case. Typically, the detonating cord terminates proximate to the ends of the perforating gun. In this arrangement, a detonator at one end of the perforating gun can detonate all of the perforating charges in the gun and continue a ballistic transfer to the opposite end of the gun. In this fashion, numerous perforating guns can be connected end to end with a single detonator detonating all of them.

The detonating cord is typically detonated by a detonator triggered by a firing head. The firing head can be actuated in many ways, including but not limited to electronically, hydraulically, and mechanically.

Expendable hollow carrier perforating guns are typically manufactured from standard sizes of steel pipe with a box end having internal/female threads at each end. Pin ended adapters, or subs, having male/external threads are threaded one or both ends of the gun. These subs can connect perforating guns together, connect perforating guns to other tools such as setting tools and collar locators, and connect firing heads to perforating guns. Subs often house electronic, mechanical, or ballistic components used to activate or otherwise control perforating guns and other components.

Perforating guns typically have a cylindrical gun body and a charge tube, or loading tube that holds the perforating charges. The gun body typically is composed of metal and is cylindrical in shape. Within a typical gun tube is a charge holder designed to hold the shaped charges. Charge holders can be formed as tubes, strips, or chains. The charge holder will contain cutouts called charge holes to house the shaped charges.

It is generally preferable to reduce the total length of any tools to be introduced into a wellbore. Among other potential benefits, reduced tool length reduces the length of the lubricator necessary to introduce the tools into a wellbore under pressure. Additionally, reduced tool length is also desirable to accommodate turns in a highly deviated or horizontal well. It is also generally preferable to reduce the tool assembly that must be performed at the well site because the well site is often a harsh environment with numerous distractions and demands on the workers on site.

Currently, perforating guns are often assembled and loaded at a service company shop, transported to the well site, and then armed before they are deployed into a well. Sometimes perforating guns are assembled and armed at the well site. Because the service company shop often employs a single gun loader, maintaining close control on the gun assembly/loading procedures can become difficult. Accordingly, quality control on the assembled/loaded guns may be improved by reducing the amount of assembly necessary at the service company shop.

Many perforating guns are electrically activated. This requires electrical wiring to at least the firing head for the perforating gun. In many cases, perforating guns are run into the well in strings where guns are activated either singly or in groups, often separate from the activation of other tools in the string, such as setting tools. In these cases, electrical communication must be able to pass through one perforating gun to other tools in the string. Typically, this involves threading at least one wire through the interior of the perforating gun and using the gun body as a ground wire.

SUMMARY OF EXAMPLE EMBODIMENTS

An example embodiment may include a mechanical delay comprising a first perforating gun, a first cylindrical body located downhole from and coupled to the first perforating gun, having a first inner bore with a radial break plugs disposed therein, a communication piston located uphole from the radial break plugs, a second cylindrical body coupled to and located downhole from the first cylindrical body having a second inner bore, a first cylindrical piston slidably disposed therein with a face exposed to the first inner bore of the first cylindrical body, a first rod coupled to and located axial downhole from the first cylindrical body, a second cylindrical piston located downhole from and coupled to the first rod and being slidably disposed within the second inner bore, the cylindrical piston having a first face and a second face, with a thru bore located transversely between the first face and the second face, a second rod located downhole from and coupled to the second cylinder, a hydraulic fluid located between the second rod and the second inner bore, and wherein explosive energy from the first perforating gun causes the communication piston to fracture the radial break plugs, thus flooding the first inner bore with wellbore fluid and forcing the combination of first cylindrical piston, first rod, second cylindrical piston, and second rod downward, thus causing the hydraulic fluid located in the second inner bore to meter through the transverse thru bore of the second cylindrical piston.

An alternative embodiment may include the first cylindrical body having one or more ports located radially and connecting the first inner bore with the outside of the first cylindrical body. A firing sub may be coupled to and located downhole of the second cylindrical body containing ball retaining rod coupled to a firing pin located axially proximate to a percussion detonator. The firing sub may be further adapted to accept a booster and detonating cord combination proximate to the percussion detonator. The firing sub may further be coupled to and located uphole from a second perforating gun. The thru bore may have an orifice disposed therein adapted to meter hydraulic fluid. The orifice may be a JEVA jet.

An example embodiment may include a method for creating a firing delay between two perforating guns comprising detonating a first perforating gun, transferring energy from the first perforating gun to a first sub containing a break plugs blocking thru ports, converting the transferred energy into momentum in a piston, breaking the break plugs with the piston, flooding the first sub, acting on a piston assembly within a second sub using wellbore fluid causing it to translate downward, metering the speed of the piston assembly translation using hydraulic fluid passing through a sized orifice, engaging the piston assembly against a firing head sub, and detonating a second perforating gun using the firing head sub, wherein the metering of the speed of the piston assembly using hydraulic fluid causes a desired time delay between the detonating of the first perforating gun and the second perforating gun.

An alternative example embodiment may include shearing pins holding the piston assembly in place. It may include metering the hydraulic fluid using an orifice. The orifice may be a JEVA jet. A detonating cord and booster may supply the energy from the first perforating gun. The firing head sub may ignite a detonating cord and booster assembly coupled to the second perforating gun.

An example embodiment a hydraulic delay apparatus comprising a housing having a frangible communication piston bore, a fluid communication bore, a working piston bore, and a hydraulic delay bore, each aligned axially with each other and the housing, the housing also having ports opening fluid communication between an area outside the housing and the fluid communication bore, a frangible communication piston positioned within the frangible communication piston bore, the frangible communication piston having a frangible element too large to pass through frangible communication piston bore and adapted to break when exposed to an explosive input, at least one frangible port plug positioned within and sealing the at least one port, a working piston within working piston bore and having a top side exposed to the fluid communication bore, a middle rod attached at a top end to the working piston opposite the top side of the working piston, a hydraulic delay piston within hydraulic delay bore and attached to a bottom end of middle rod at a top side of hydraulic delay piston, the hydraulic delay piston having a flow restrictor allowing fluid communication between the top side and a bottom side of hydraulic delay piston, a bottom rod attached at a top end to the bottom side of hydraulic delay piston, wherein hydraulic delay bore is filled with a hydraulic fluid, frangible port plug is adapted to be broken by frangible communication piston and allow fluid to flow through port once broken, and wherein a wellbore fluid entering the fluid communication bore through ports applies pressure to the top side of working piston, which applies force to the hydraulic delay piston through middle rod causing the hydraulic fluid to flow through the flow restrictor to the top side of hydraulic delay piston allowing hydraulic delay piston to move downward relative to housing. The flow restrictor may be a JEVA style jet.

An example embodiment may include a hydraulic delay apparatus comprising a housing having a frangible communication piston bore, a fluid communication bore, a working piston bore, and a hydraulic delay bore, each aligned axially with each other and the housing, the housing also having ports opening fluid communication between an area outside the housing and the fluid communication bore, a frangible communication piston positioned within the frangible communication piston bore, the frangible communication piston having a frangible element too large to pass through frangible communication piston bore and adapted to break when exposed to an explosive input, at least one frangible port plug positioned within and sealing the at least one port, a working piston within working piston bore and having a top side exposed to the fluid communication bore, a middle rod attached at a top end to the working piston opposite the top side of the working piston, a hydraulic delay piston within hydraulic delay bore and attached to a bottom end of middle rod at a top side of hydraulic delay piston, the hydraulic delay piston having a flow restrictor allowing fluid communication between the top side and a bottom side of hydraulic delay piston, a bottom rod attached at a top end to the bottom side of hydraulic delay piston, a hydraulic firing head coupled to and located downhole of the housing and further containing a ball retaining rod coupled to a firing pin located axially proximate to a percussion detonator, wherein the firing sub is further adapted to fire a perforating gun coupled proximate and adjacent to the percussion detonator, wherein hydraulic delay bore is filled with a hydraulic fluid, frangible port plug is adapted to be broken by frangible communication piston and allow fluid to flow through port once broken, and wherein a wellbore fluid entering the fluid communication bore through ports applies pressure to the top side of working piston, which applies force to the hydraulic delay piston through middle rod causing the hydraulic fluid to flow through the flow restrictor to the top side of hydraulic delay piston allowing hydraulic delay piston to move downward relative to housing. The flow restrictor may be a JEVA style jet.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Figure 1:
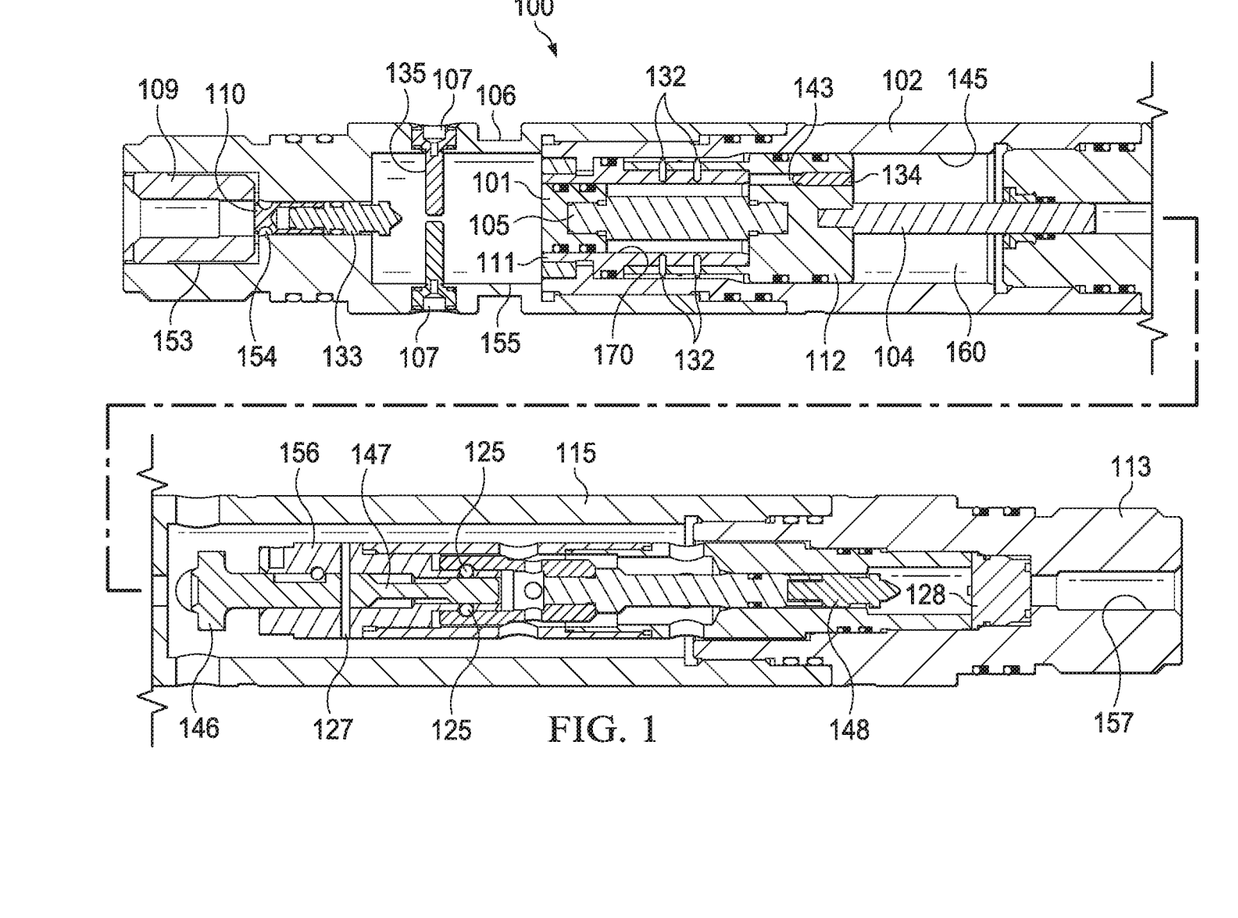
FIG. 1 depicts a cross section of an example embodiment in its initial configuration before activating the mechanical delay.

An example embodiment is shown in FIG. 1 of a hydraulic variable time delay sub 100. This sub performs the task of a pyrotechnic delay fuse by using mechanical motion instead of a chemical reaction. In this design there is a communication sub 106 that is coupled to and located below a first perforating gun. An alignment insert 109 that is slidably disposed in the first bore 153 of the communication sub 106 accepts the end of a detonating cord with a booster from the first perforating gun. A shear grooved cap 110 is located between the alignment insert 109 and the communication piston 133. Communication piston 133 is substantially cylindrical and slidably disposed within the second bore 154 of the communication sub 106. Communication piston 133 may be a frangible communication piston that shears at the shear grooved cap 110 when a proximate located booster is fired. The communication sub 106 has one or more ports 107 for putting the third bore 155 in fluid communication with the wellbore when the delay sub 100 is activated. Break plugs 135 prevents fluid communication in the initial starting configuration shown in FIG. 1.

A meter sub 102 is coupled below the communication sub 106. The meter sub 102 houses a working piston 101 held in place by within the working piston bore 170 of sleeve 111 and threaded to a middle rod 105 which is further threaded to a hydraulic delay 112, which is then further threaded to a bottom rod 104. This allows for the working piston 101, middle rod 105, hydraulic delay 112, and the bottom rod 104 to slide upwards and downwards in unison within the inner bore 145 of the meter sub 102. A firing head housing 115, in this case an industry standard firing head commonly used with perforating guns, is coupled below the meter sub 102. The volume 160, defined by the hydraulic delay 112, the hydraulic fluid bore 145, the bottom rod 104, and the firing head housing 115 create a hydraulic fluid chamber, volume 160, storing hydraulic fluid. Initially installed, the combination of working piston 101, middle rod 105, hydraulic delay 112, and the bottom rod 104 are located as far upward as possible to store the maximum hydraulic fluid in volume 160.

Still referring to FIG. 1, the hydraulic delay 112 has one or more fluid ports 143 that provide fluid communication between the uphole and the downhole ends of the hydraulic delay 112. Within the fluid port 143 there is a single orifice flow restrictor 134, such as a JEVA jet, that meters the flow of the hydraulic fluid as it moves from the downhole side of the hydraulic delay 112 defined by volume 160 to the uphole side. The flow of hydraulic fluid through the fluid port 143 is caused by the motion of the hydraulic delay 112 downhole.

Within the firing head 115 there is a ball retaining rod 146 held in place by one or more shear pins 127. The rod 146 has an undercut 147. The rod 146 is coupled to the firing pin 148. Balls 125 provide friction holding the rod 146 in place. The rod 146 is slidable engaged with the rod retainer 156. When the rod 146 slides downhole within the firing head 115 the undercut 147 reaches the balls 125, causing the friction holding the rod 146 in place to release, thus allowing the rod 146, and hence the firing pin 148, to then quickly travel downhole, impacting the percussion detonator 128. The impact of the firing pin 148 with the percussion detonator 128 ignites a booster coupled to a detonating cord located in the bore 157. This detonating cord is connected to a second perforating gun coupled downhole of the firing head 115 via sub 113.

Still referring to FIG. 1, the detonation of the first perforating gun located above the time delay sub 100 will result with the end of the detonating cord and booster igniting within the alignment insert 109. The force from the exploding booster and detonating cord will push the communication piston 107 downward, thus breaching the break plugs 135. This results in downhole fluids entering the majority of the third bore 155. The wellbore fluid then acts on the working piston 101, shearing pins 132 forcibly sliding the working piston 101 downward. Since the working piston 101 is coupled to the middle rod 105, which is coupled to the hydraulic delay 112, this results in the hydraulic delay 112 begins moving downward against the hydraulic fluid in volume 160.

As the hydraulic delay 112 moves downhole, the hydraulic fluid in volume 160 is forced through the port 143 with the flow rate controlled the orifice flow restrictor 134, in this example a JEVA style jet. The metering effect of the JEVA style jet is what causes the time delay between the first perforating gun and the second perforating gun.

Figure 2:
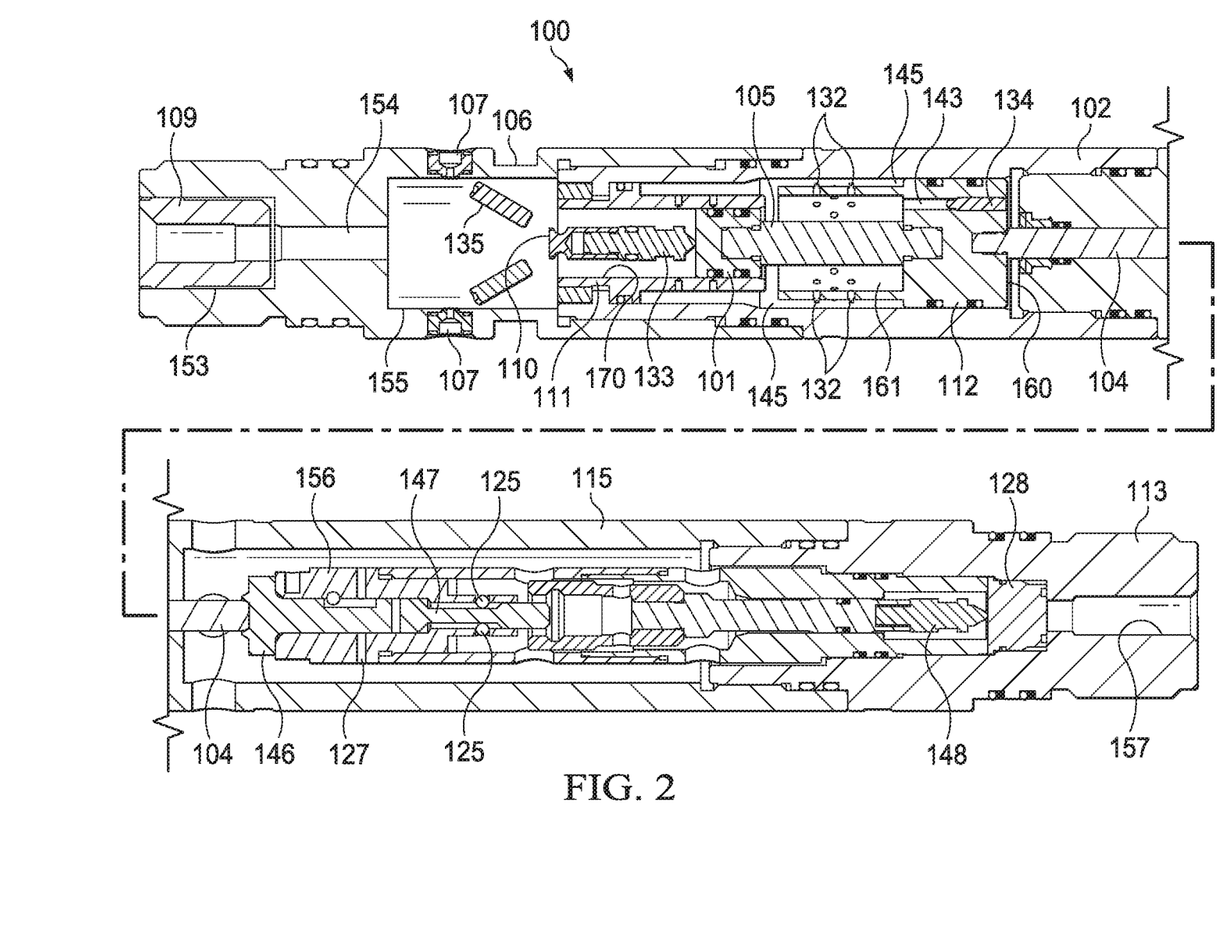
FIG. 2 depicts a cross section of an example embodiment in its final configuration after the mechanical delay has been activated.

A fully activated hydraulic variable time delay sub 100 is shown in FIG. 2. Within the communication sub 106 a booster has been fired in the alignment insert 109 within the first bore 153, compromising the shear groove 110 and forcing the communication piston 133 out of bore 154 and through the break plugs 135. The rupturing of break plugs 135 puts the third bore 155 in fluid communication with the wellbore via ports 107.

Still referring to FIG. 2, the meter sub 102 coupled below the communication sub 106 has the working piston 101 forced fully downhole within the working piston bore 170. This downward movement by working piston 101 has forced the middle rod 105, hydraulic delay 112, and the bottom rod 104 to slide fully downhole the inner bore 145 of the meter sub 102. Volume 160 is completely compressed and a second volume 161 has been created by hydraulic delay 112, middle rod 105, and sleeve 111. The hydraulic fluid has been largely forced out of volume 160 through the metering orifice 134 located in thru bore 143. Pins 132 that were holding the sleeve 111 to the hydraulic delay 112 have been sheared.

Within the firing head housing 115 coupled below the meter sub 102, ball retaining rod 146 slideably engaged with the rod retainer 156, has sheared pins 127. The undercut 147 have released balls 125, thus allowing the rod 146, and hence the firing pin 148, to travel downhole and impact percussion detonator 128. The impact of the firing pin 148 with the percussion detonator 128 will have ignited a booster coupled to a detonating cord located in the bore 157. This detonating cord is connected to a second perforating gun coupled downhole of the firing head 115 via sub 113. Thus the second perforating gun has been fired at some desired delay of time after the first perforating gun has been fired. The desired delay can be determined by the combination of the size of orifice 134 and the hydraulic fluid.

Figure 3:
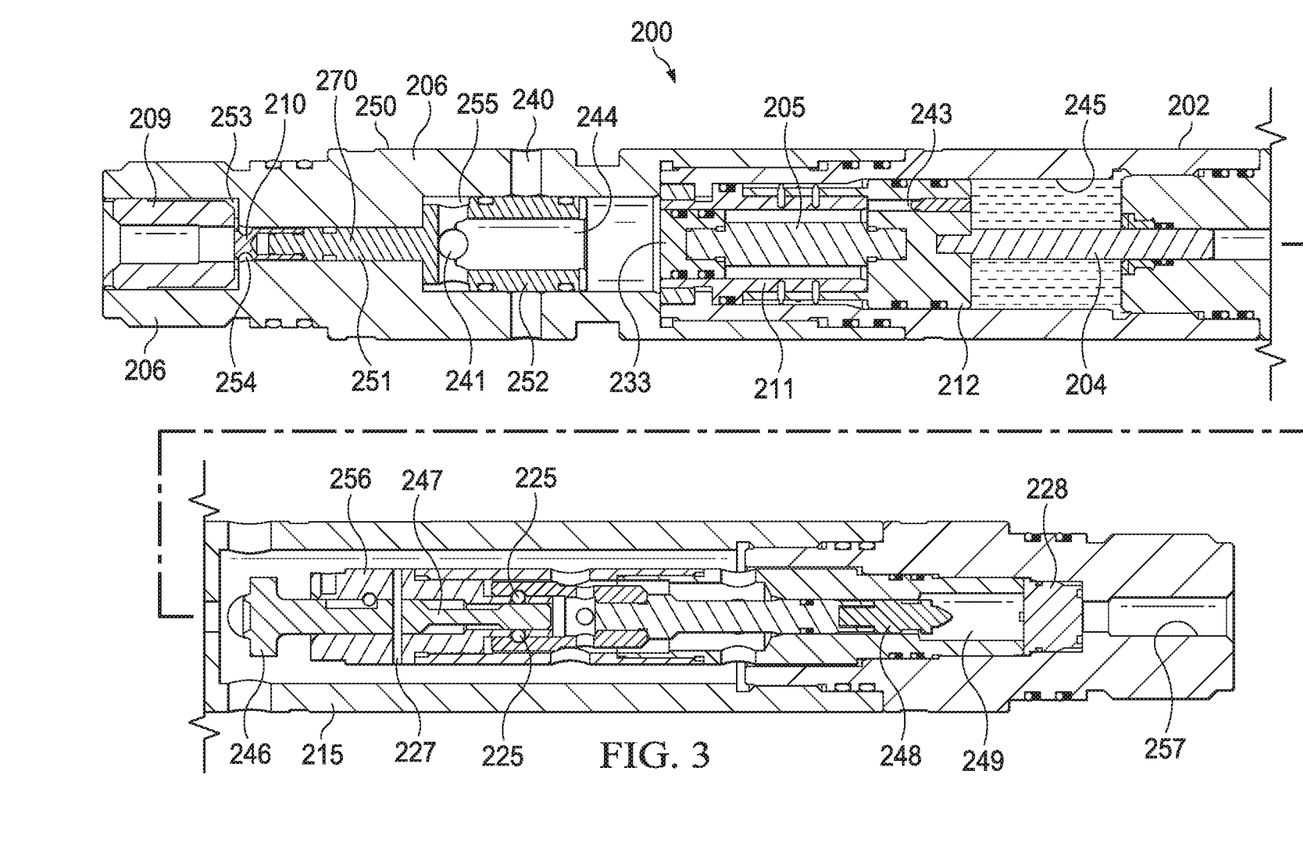
FIG. 3 depicts a cross section of an alternative example embodiment in its initial configuration before activating the mechanical delay.

An example embodiment is shown in FIG. 3 of a hydraulic variable time delay sub 200. This sub performs the task of a pyrotechnic delay fuse, but instead by using mechanical motion instead of a chemical reaction. In this design there is a communication sub 206 with outer surface 250 is coupled to and located below a first perforating gun. An alignment insert 209 that is slidably disposed in the first bore 253 of the communication sub 206 accepts the end of a detonating cord with a booster from the first perforating gun. A shear grooved cap 210 is located between the alignment insert 209 and the communication piston 270. Communication piston 270 has a first cylindrical portion 251 slidably disposed within the second bore 254 of the communication sub 206. The second cylindrical portion 252 of the communication piston 270 is slidably engaged with the third bore 255 of the communication sub 206. The communication sub 206 has one of more ports 240 that put the third bore 255 in fluid communication with the wellbore surround outer surface 250. O-rings and backup rings prevent the downhole fluids from entering the majority of the third bore 255 when the communication piston 270 is in its initial starting position. The second cylindrical portion 252 has one or more piston ports 241, which in this example are two thru holes located perpendicular to each other about the center axis of the hydraulic variable time delay sub 200. The piston ports 241 puts the third bore 255 in fluid communication with the inner piston bore 244.

A meter sub 202 is coupled below the communication sub 206. The meter sub 202 houses a working piston 233 threaded to a middle rod 205 which is further threaded to a hydraulic delay 212, which is then further threaded to a bottom rod 204. This allows for the working piston 233, middle rod 205, hydraulic delay 212, and the bottom rod 204 to slide upwards and downwards in unison within the inner bore 245 of the meter sub 202. A firing head housing 215 is coupled below the meter sub 202. The volume defined by the hydraulic delay 212, the hydraulic fluid bore 245, the bottom rod 204, and the firing head housing 215 create a hydraulic fluid chamber 245 storing hydraulic fluid. Initially installed, the combination of working piston 233, middle rod 205, hydraulic delay 212, and the bottom rod 204 are located as far upward as possible to store the maximum hydraulic fluid.

Still referring to FIG. 3, the hydraulic delay 212 has one or more fluid ports 243 that provide fluid communication between the uphole and the downhole ends of the hydraulic delay 212. Within the fluid port 243 there is a single orifice flow restrictor, such as a JEVA jet, that meters the flow of the hydraulic fluid as it moves from the downhole side of the hydraulic delay 212 to the uphole side. The fluid of hydraulic fluid through the fluid port 243 is caused by the motion of the hydraulic delay 212 downwards.

Within the firing head 215 there is a ball retaining rod 246 held in place by one or more shear pins 227. The rod 246 has an undercut 247. The rod 246 is coupled to the firing pin 248 contained within firing pin retainer 249. Balls 225 provide friction holding the rod 246 in place. The rod 246 is slidably engaged with the rod retainer 256. When the rod 246 slides downhole within the firing head 215 the undercut 247 reaches the balls 225, causing the friction holding the rod 246 in place to release, thus allowing the rod 246, and hence the firing pin 248, to then quickly travel downhole until it impacts the percussion detonator 228. The impact of the firing pin 248 with the percussion detonator 228 ignites a booster coupled to a detonating cord located in the bore 257. This detonating cord is connected to a second perforating gun coupled downhole of the firing head 215.

Still referring to FIG. 3, the detonation of the first perforating gun located above the time delay sub 200 will result with the end of the detonating cord and booster igniting within the alignment insert 209. The force from the exploding booster and detonating cord will push the communication piston 270 downward, resulting in the o-rings and backup rings moving below the ports 240. This results in downhole fluids entering the majority of the third bore 255. The downhole fluid will then enter the piston ports 241 and fill the inner piston bore 244. The wellbore fluid then acts on the working piston 233, forcibly sliding it downward. Since the working piston 233 is coupled to the middle rod 205, which is coupled to the hydraulic delay 212, this results in the hydraulic delay 212 begins moving downward against the hydraulic fluid.

As the hydraulic delay 212 moves downhole, the hydraulic fluid is forced through the port 243 with the flow rate controlled by a JEVA style jet. The metering effect of the hydraulic fluid is what causes the time delay between the first perforating gun and the second perforating gun.

In an alternative embodiment a frangible disk may be used instead of the break plugs as shown in the example embodiments.

The benefits of using a mechanical delay rather than a pyrotechnic delay fuse may include that it is easier to ship since there are no explosive components, it is reusable because the mechanical delay is not damaged by a pyrotechnic, and it is easily variable because different JEVA jets can be used to provide different delay times.

Although the invention has been described in terms of embodiments which are set forth in detail, it should be understood that this is by illustration only and that the invention is not necessarily limited thereto. For example, terms such as upper and lower or top and bottom can be substituted with uphole and downhole, respectfully. Top and bottom could be left and right, respectively. Uphole and downhole could be shown in figures as left and right, respectively, or top and bottom, respectively. Generally downhole tools initially enter the borehole in a vertical orientation, but since some boreholes end up horizontal, the orientation of the tool may change. In that case downhole, lower, or bottom is generally a component in the tool string that enters the borehole before a component referred to as uphole, upper, or top, relatively speaking. The first housing and second housing may be top housing and bottom housing, respectfully. In a gun to gun delay such as described herein, the first gun may be the uphole gun or the downhole gun, same for the second gun, and the uphole or downhole references can be swapped as they are merely used to describe the location relationship of the various components. Terms like wellbore, borehole, well, bore, oil well, and other alternatives may be used synonymously. Terms like tool string, tool, perforating gun string, gun string, or downhole tools, and other alternatives may be used synonymously. The alternative embodiments and operating techniques will become apparent to those of ordinary skill in the art in view of the present disclosure. Accordingly, modifications of the invention are contemplated which may be made without departing from the spirit of the claimed invention.

What is claimed is:
1. A mechanical delay comprising:
a first perforating gun;
a first cylindrical body located downhole from and coupled to the first perforating gun, having a first inner bore with radial break plugs disposed therein, a communication piston located uphole from the radial break plugs;
a second cylindrical body coupled to and located downhole from the first cylindrical body having:
a second inner bore;
a first cylindrical piston slidably disposed therein with a face exposed to the first inner bore of the first cylindrical body;
a first rod coupled to and located axially downhole from the first cylindrical piston;

a second cylindrical piston located downhole from and coupled to the first rod and being slidably disposed within the second inner bore, the cylindrical piston having a first face and a second face, with a thru bore located transversely between the first face and the second face;

a second rod located downhole from and coupled to the second cylinder;

hydraulic fluid located between the second rod and the second inner bore; and wherein explosive energy from the first perforating gun causes the communication piston to fracture the radial break plugs, thus flooding the first inner bore with wellbore fluid and forcing the combination of first cylindrical piston, first rod, second cylindrical piston, and second rod downward, thus causing the hydraulic fluid located in the second inner bore to meter through the transverse thru bore of the second cylindrical piston.

2. The apparatus of claim 1 further comprising the first cylindrical body having one or more ports located radially and connecting the first inner bore with the outside of the first cylindrical body.

3. The apparatus of claim 1 further comprising a firing sub coupled to and located downhole of the second cylindrical body containing a ball retaining rod coupled to a firing pin located axially proximate to a percussion detonator.

4. The apparatus of claim 1 wherein the firing sub is further adapted to accept a booster and detonating cord combination proximate to the percussion detonator.

5. The apparatus of claim 1 wherein the firing sub further coupled to and located uphole from a second perforating gun.

6. The apparatus of claim 1 further comprising the thru bore having a orifice disposed therein adapted to meter hydraulic fluid.

7. The apparatus of claim 6 wherein the orifice is a JEVA jet.

8. A method for creating a firing delay between two perforating guns comprising:
   detonating a first perforating gun;
   transferring energy from the first perforating gun to a first sub containing a break plugs blocking thru ports;
   converting the transferred energy into momentum in a piston;
   breaking the break plugs with the piston;
   flooding the first sub;
   acting on a piston assembly within a second sub using wellbore fluid causing it to translate downward;
   metering the speed of the piston assembly translation using hydraulic fluid passing through a sized orifice;
   engaging the piston assembly against a firing head sub; and
   detonating a second perforating gun using the firing head sub, wherein the metering of the speed of the piston assembly using hydraulic fluid causes a desired time delay between the detonating of the first perforating gun and the second perforating gun.

9. The method of claim 8 further comprising shearing pins holding the piston assembly in place.

10. The method of claim 8 further comprising metering the hydraulic fluid using an orifice.

11. The method of claim 10 wherein the orifice is a JEVA jet.

12. The method of claim 8 further comprising a detonating cord and booster supplying the energy from the first perforating gun.

13. The method of claim 8 further comprising the firing head sub igniting a detonating cord and booster assembly coupled to the second perforating gun.

14. A hydraulic delay apparatus comprising:
   a housing 106 having a frangible communication piston bore 154, a fluid communication bore 155, a working piston bore 170, and a hydraulic delay bore 145, each aligned axially with each other and the housing 106, the housing 106 also having ports 107 opening fluid communication between an area outside the housing 106 and the fluid communication bore 155;
   a frangible communication piston 133 positioned within the frangible communication piston bore 154, the frangible communication piston having a frangible element too large to pass through frangible communication piston bore 154 and adapted to break when exposed to an explosive input;
   at least one frangible port plug 135 positioned within and sealing the at least one port 107;
   a working piston 101 within working piston bore 170 and having a top side exposed to the fluid communication bore 155;
   a middle rod 105 attached at a top end to the working piston 101 opposite the top side of the working piston;
   a hydraulic delay piston 112 within hydraulic delay bore 145 and attached to a bottom end of middle rod 105 at a top side of hydraulic delay piston 112, the hydraulic delay piston having a flow restrictor 134 allowing fluid communication between the top side and a bottom side of hydraulic delay piston 112;
   a bottom rod 104 attached at a top end to the bottom side of hydraulic delay piston 112;
   wherein hydraulic delay bore 145 is filled with a hydraulic fluid, frangible port plug 135 is adapted to be broken by frangible communication piston 133 and allow fluid to flow through port 107 once broken; and
   wherein a wellbore fluid entering the fluid communication bore 155 through ports 107 applies pressure to the top side of working piston 101, which applies force to the hydraulic delay piston 112 through middle rod 105 causing the hydraulic fluid to flow through the flow restrictor 134 to the top side of hydraulic delay piston 112 allowing hydraulic delay piston 112 to move downward relative to housing 106.

15. The apparatus of claim 14 wherein the flow restrictor is a JEVA style jet.

16. A hydraulic delay apparatus comprising:
   a housing having a frangible communication piston bore, a fluid communication bore, a working piston bore, and a hydraulic delay bore, each aligned axially with each other and the housing, the housing also having at least one port opening fluid communication between an area outside the housing and the fluid communication bore;
   a frangible communication piston positioned within the frangible communication piston bore, the frangible communication piston having a frangible element too large to pass through frangible communication piston bore and adapted to break when exposed to an explosive input;
   at least one frangible port plug each positioned within and sealing a respective port of the at least one port;
   a working piston within working piston bore and having a top side exposed to the fluid communication bore;
   a middle rod attached at a top end to the working piston opposite the top side of the working piston; a hydraulic delay piston within hydraulic delay bore and attached to a bottom end of middle rod at a top side of hydraulic delay piston, the hydraulic delay piston having a flow restrictor allowing fluid communication between the top side and a bottom side of hydraulic delay piston;

a bottom rod attached at a top end to the bottom side of hydraulic delay piston;

a hydraulic firing head coupled to and located downhole of the housing and further containing a ball retaining rod coupled to a firing pin located axially proximate to a percussion detonator, wherein the firing sub is further adapted to fire a perforating gun coupled proximate and adjacent to the percussion detonator;

wherein the hydraulic delay bore is filled with a hydraulic fluid, the at least one frangible port plug is adapted to be broken by frangible communication piston and allow fluid to flow through the respective port of the at least one port once broken; and wherein a wellbore fluid entering the fluid communication bore through the at least one port applies pressure to the top side of working piston, which applies force to the hydraulic delay piston through middle rod causing the hydraulic fluid to flow through the flow restrictor to the top side of hydraulic delay piston allowing hydraulic delay piston to move downward relative to housing.

17. The apparatus of claim 16 wherein the flow restrictor is a JEVA style jet.

* * * * *